United States Patent
Adler et al.

(10) Patent No.: US 12,103,505 B2
(45) Date of Patent: Oct. 1, 2024

(54) BRAKE SYSTEM FOR A VEHICLE

(71) Applicant: Knorr-Bremse Systeme Fuer Nutzfahrzeuge GmbH, Munich (DE)

(72) Inventors: Tamas Adler, Erd (HU); Tamas Rapp, Budapest (HU); Huba Nemeth, Budapest (HU); Kornel Straub, Pomáz (HU); Csaba Horvath, Biatorbagy (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 539 days.

(21) Appl. No.: 17/273,583

(22) PCT Filed: Sep. 2, 2019

(86) PCT No.: PCT/EP2019/073312
§ 371 (c)(1),
(2) Date: Mar. 4, 2021

(87) PCT Pub. No.: WO2020/057948
PCT Pub. Date: Mar. 26, 2020

(65) Prior Publication Data
US 2021/0323523 A1      Oct. 21, 2021

(30) Foreign Application Priority Data
Sep. 18, 2018   (EP) ...................................... 18195172

(51) Int. Cl.
*B60T 13/66*   (2006.01)
*B60T 8/88*    (2006.01)
(Continued)

(52) U.S. Cl.
CPC ............ *B60T 13/662* (2013.01); *B60T 8/885* (2013.01); *B60T 8/94* (2013.01); *B60T 13/385* (2013.01);
(Continued)

(58) Field of Classification Search
CPC ............. B60T 13/683; B60T 2270/402; B60T 2270/413; B60T 2270/414; B60T 8/94;
(Continued)

(56) References Cited

U.S. PATENT DOCUMENTS 4,749,238 A * 6/1988 Singleton .............. B60T 13/662
                                                        303/7
5,328,251 A    7/1994 Brearley
(Continued)

FOREIGN PATENT DOCUMENTS

CN      101505989 A    8/2009
CN      106394538 A    2/2017
(Continued)

OTHER PUBLICATIONS

International Search Report for PCT/EP2019/073312 Issued Dec. 3, 2019.

*Primary Examiner* — Vishal R Sahni
(74) *Attorney, Agent, or Firm* — NORTON ROSE FULBRIGHT US LLP; Gerard A. Messina (57) ABSTRACT

A brake system includes a first electric power-supply-unit (EPSU) and a first electronic-brake-control-unit (EBCU). The first EBCU is connected to the first EPSU. Also, the brake system includes a second EPSU and a second EBCU, which is connected to the second EPSU. The brake system further includes a first axle-pressure-modulator (APM) for service-brake-chambers associated with a first vehicle-axle. The brake system includes a second APM for spring-brake-cylinders for a second vehicle-axle. The brake system
(Continued)

includes two power-supply-switches (PSS). A first PSS is connected to the first EBCU, the second EBCU and the first APM and configured to connect the first EBCU or the second EBCU to the first APM. A second PSS is connected to the first EBCU, the second EBCU and the second APM and configured to connect the first EBCU or the second EBCU to the second APM.

8 Claims, 6 Drawing Sheets

(51) Int. Cl.
*B60T 8/94* (2006.01)
*B60T 13/38* (2006.01)
*B60T 13/62* (2006.01)
*B60T 13/68* (2006.01)
*B60T 17/18* (2006.01)
*B60T 7/04* (2006.01)
*B60T 7/12* (2006.01)
*B60T 8/17* (2006.01)
*B60T 13/36* (2006.01)

(52) U.S. Cl.
CPC ............ *B60T 13/62* (2013.01); *B60T 13/683* (2013.01); *B60T 17/18* (2013.01); *B60T 7/04* (2013.01); *B60T 7/12* (2013.01); *B60T 8/17* (2013.01); *B60T 13/36* (2013.01); *B60T 2260/08* (2013.01); *B60T 2270/402* (2013.01); *B60T 2270/404* (2013.01); *B60T 2270/413* (2013.01); *B60T 2270/414* (2013.01)

(58) Field of Classification Search
CPC ... B60T 8/885; B60T 8/17; B60T 7/12; B60T 7/04; B60T 2270/404; B60T 2260/08; B60T 17/18; B60T 13/662; B60T 13/62; B60T 13/385; B60T 13/36; B60T 7/18; B60T 2270/08

See application file for complete search history.

(56) References Cited

U.S. PATENT DOCUMENTS

| | | | | |
|---|---|---|---|---|
| 6,463,373 | B2 * | 10/2002 | Suganuma | B60W 50/029 |
| | | | | 701/48 |
| 2006/0244309 | A1 * | 11/2006 | Claussen | B60T 8/885 |
| | | | | 303/123 |
| 2007/0170774 | A1 * | 7/2007 | Gerum | B60T 13/66 |
| | | | | 188/140 R |
| 2011/0005874 | A1 * | 1/2011 | Beier | B60T 13/66 |
| | | | | 188/106 P |
| 2018/0362008 | A1 * | 12/2018 | Farres | B60T 13/662 |
| 2019/0092297 | A1 * | 3/2019 | Ayichew | B60T 7/16 |
| 2019/0248350 | A1 * | 8/2019 | Wulf | B60T 13/683 |
| 2021/0031741 | A1 * | 2/2021 | Alford | B60T 13/662 |

FOREIGN PATENT DOCUMENTS

| | | | | |
|---|---|---|---|---|
| CN | 207725389 | U | 8/2018 | |
| DE | 102008009043 | B3 | 5/2009 | |
| DE | 102016005318 | A1 | 11/2017 | |
| EP | 394065 | A * | 10/1990 | ............ B60T 13/263 |
| EP | 1968831 | B1 * | 10/2010 | ............. B60T 8/321 |
| EP | 2570317 | A1 * | 3/2013 | ............. B60T 13/66 |
| EP | 2977282 | A1 * | 1/2016 | ............ B60T 13/588 |
| GB | 2448007 | A * | 10/2008 | ........... B60T 13/683 |
| WO | 2009152982 | A2 | 12/2009 | |

* cited by examiner

BRAKE SYSTEM FOR A VEHICLE

FIELD OF THE INVENTION

The present invention relates to a brake system for a vehicle, to a vehicle with said brake system, and to a method of controlling a brake system for a vehicle.

BACKGROUND INFORMATION

Autonomous or near-autonomous operation of transport vehicles is a relatively new field of technology. More sophisticated functions require special hardware infrastructure. For example, present commercial vehicle systems require the presence and attention of a driver. However, in the future the driver will be less involved in the driving control task of the vehicle, and automated systems are supposed to take over more significant driving functions, which requires increased reliability levels and consequently different types of system redundancies.

Commercial vehicles conventionally use electro-pneumatic or by-wire brake systems, wherein the electronic part of the control is realized as a single-circuit control. In case of malfunction of the control electronics, the driver is able to control the pneumatic part of the brake system by their foot because a two-circuit pneumatic backup system still is available. In case of highly automated vehicles where the driver is not in the control loop anymore, or even not available or present in the vehicle, the above brake system would be unsatisfactory, since there is no arrangement/structure which would substitute the brake control by the driver in case of malfunction of the single electronic control circuit. Therefore some redundancy is to be added to the control of a brake system.

Patent document DE 10 2008 009 043 B3 discusses a redundant brake system for a commercial vehicle. The system utilizes a parking brake integrated into an air supply unit as a redundant brake actuator. For axles not equipped with spring parking brake chambers, a control output of a trailer control module is used as pneumatic control input of axle modulators.

SUMMARY OF THE INVENTION

Against this background, it is an object of the present invention to provide an improved brake system for a vehicle, an improved vehicle with said brake system, and an improved method of controlling a brake system for a vehicle.

This object may be achieved by a brake system for a vehicle, by a vehicle with said brake system, and by a method of controlling a brake system for a vehicle according to the main claims.

According to embodiments, for example, a redundant brake system or brake system with redundancy for a vehicle may be provided, wherein axle or wheel pressure modulators of the brake system may have dual power supply and dual communication channel interfaces used for redundancy for brake actuation. One of the main components to provide redundancy may be axle modulators with at least two communication channels. Another one of the main components may be power supply switches or distributors for selecting power supply for the axle modulators from any of two separate electric power sources. Furthermore, there may be provided a redundant pair of electronic brake control units supplied from the independent electric power sources.

Advantageously, according to embodiments, additional redundancy can be provided by making minimum changes to and also or alternatively without adding more components to a state-of-the-art brake system. Hence, costs for providing redundancy can be minimized. In particular, electric redundancy can be ensured, as opposed to only pneumatically redundancy. Furthermore, the proposed redundant brake system has a pneumatic layout appropriate for autonomous driving applications. Thus, for example, failsafe operation of a vehicle brake system can be provided both electrically and pneumatically.

A brake system for a vehicle comprises:
a first electric power supply unit;
a first electronic brake control unit, wherein the first electronic brake control unit is connected to the first electric power supply unit;
a second electric power supply unit;
a second electronic brake control unit, wherein the second electronic brake control unit is connected to the second electric power supply unit;
a first axle pressure modulator for service brake chambers associated with a first axle of the vehicle;
a second axle pressure modulator for spring brake cylinders associated with a second axle of the vehicle; and
two power supply switches, wherein a first one of the power supply switches is connected to the first electronic brake control unit, the second electronic brake control unit and the first axle pressure modulator and configured to connect the first electronic brake control unit or the second electronic brake control unit to the first axle pressure modulator, wherein a second one of the power supply switches is connected to the first electronic brake control unit, the second electronic brake control unit and the second axle pressure modulator and configured to connect the first electronic brake control unit or the second electronic brake control unit to the second axle pressure modulator.

The vehicle may be a utility vehicle or commercial vehicle, for example a truck, bus or the like. The service brake chambers and the spring brake cylinders may represent brake actuators of the brake system. The electric power supply units may be batteries. The brake system may also comprise an electronic parking brake controller. The electronic parking brake controller may be connected to at least one of the electric power supply units. The electronic parking brake controller may be fluidically connected to the spring brake cylinders.

According to an embodiment, the first electric power supply unit and the first electronic brake control unit may form part of a first service brake subsystem. The second electric power supply unit and the second electronic brake control unit may form part of a second service brake subsystem. In the event of a malfunction of the first service brake subsystem, the second service brake subsystem may be usable as a redundant service brake subsystem. In other words, the second service brake subsystem may be used to redundantly perform service brake functions in the event of a malfunction of the first service brake subsystem. In particular, the second electronic brake control unit may be used instead of the first electronic brake control unit to perform service brake functions in the event of a malfunction of the first service brake subsystem. A brake subsystem may also be referred to as a brake circuit. Such an embodiment offers the advantage that redundancy can be added to the brake system to enhance safety, in particular for autonomous driving applications.

According to an embodiment, the brake system may comprise a communication switch. The communication switch may be connected to the first electronic brake control unit, the second electronic brake control unit and a trailer communication interface for communication with a trailer brake system. The communication switch may be configured to connect the first electronic brake control unit or the second electronic brake control unit to the trailer communication interface. In other words, the trailer communication interface may be shared between the electronic brake control units. Such an embodiment offers the advantage that the redundant electronic brake control unit may communicate with the trailer brake system through the communication switch even if one of the electronic brake control units is down.

According to an embodiment, the brake system may comprise pressure control valves connected between the first axle pressure modulator and the service brake chambers. The pressure control valves may be connected to the first electronic brake control unit. The brake system may also comprise additional pressure control valves connected between the pressure control valves and the service brake chambers. The additional pressure control valves may be connected to the second electronic brake control unit. The additional pressure control valves may be referred to as pressure modulators. Such an embodiment offers the advantage that additional pressure modulators on a front axle may ensure the same functionality for the redundant brake system compared to an intact brake system even in case of failure of any of the electronic brake control units. This means that the pressure on the front axle can be modulated sidewise independently in case of a single failure.

According to an embodiment, the first electronic brake control unit and the second electronic brake control unit may be identical units. Such an embodiment offers the advantage that existing components of brake systems can be used without redesign, thus keeping costs low and design simple.

According to an embodiment, the second electronic brake control unit may be integrated into another component of the brake system, in particular into an electronic parking brake controller and additionally or alternatively an electronic air supply control unit. Such an embodiment offers the advantage that the brake system can be made more space-saving, and a mounting or installation process can be simplified, thus reducing manufacturing cost.

According to an embodiment, the brake system may comprise a control room link for fluidically linking the first axle pressure modulator and the second axle pressure modulator. Such an embodiment offers the advantage that brake actuators of an axle the associated axle pressure modulator of which suffers a failure can still remain controllable via the other axle pressure modulator.

According to an embodiment, the brake system may comprise two interrupt valves and a foot brake module. The foot brake module may be connected to the first electronic brake control unit and the second electronic brake control unit. The foot brake module may be fluidically connected to a first compressed air supply module for the first axle pressure modulator and to a second compressed air supply module for the second axle pressure modulator. The interrupt valves may be connected into the control room link. The interrupt valves may be fluidically connected to the foot brake module. The interrupt valves may be configured to fluidically connect the first axle pressure modulator and the second axle pressure modulator to each other or to the foot brake module. The interrupt valves may be monostable select high valves. Such an embodiment offers the advantage that pneumatic backup may be provided as another form of redundancy of the brake system. The control room link can be interrupted between the axle pressure modulators. More specifically, backup ports of the axle pressure modulators may then be controlled by a pneumatic output of the foot brake module.

According to an embodiment, the brake system may comprise a trailer control module for controlling braking functions of a trailer of the vehicle. The trailer control module may be connected to the first electronic brake control unit. The trailer control module may be fluidically connected to the second axle pressure modulator. An electronic parking brake controller may be fluidically connected to the trailer control module. Such an embodiment offers the advantage that also a trailer may be connected to the vehicle, which acts as a tractor, and reliably connected to the redundant brake system.

A vehicle comprises:
an embodiment of the aforementioned the brake system;
the first axle, with which the first axle pressure modulator of the brake system is associated; and
the second axle, with which the second axle pressure modulator of the brake system is associated.

The first axle pressure modulator may be mounted in the vicinity of the first axle. Further elements of the brake system associated with the first axle pressure modulator, such as the first pressure modulator, the service brake chambers and valves, may also be mounted in the vicinity of the first axle. The second axle pressure modulator may be mounted in the vicinity of the second axle. Further elements of the brake system associated with the second axle pressure modulator, such as the second pressure modulator, the spring brake cylinders, may also be mounted in the vicinity of the second axle.

A method of controlling a brake system for a vehicle, wherein the brake system is an embodiment of the aforementioned brake system, comprises:
receiving an error signal representing a malfunction of the first electric power supply unit or the first electronic brake control unit or a malfunction of the second electric power supply unit or the second electronic brake control unit; and
transmitting service brake commands of the vehicle to the second electronic brake control unit in the event of a malfunction of the first electric power supply unit or the first electronic brake control unit or to the first electronic brake control unit in the event of a malfunction of the second electric power supply unit or the second electronic brake control unit.

The method or the steps of the method may be executed using a controller. Thus, the method may be executed to control an embodiment of the aforementioned brake system.

Embodiments of the approach presented here shall be explained in greater detail in the subsequent description with reference to the figures.

DETAILED DESCRIPTION

In the following description of advantageous embodiments of the present invention, the same or similar reference numerals shall be used for the elements depicted in the various figures and acting in a similar way, wherein repeated description of these elements shall be omitted.

Figure 1:
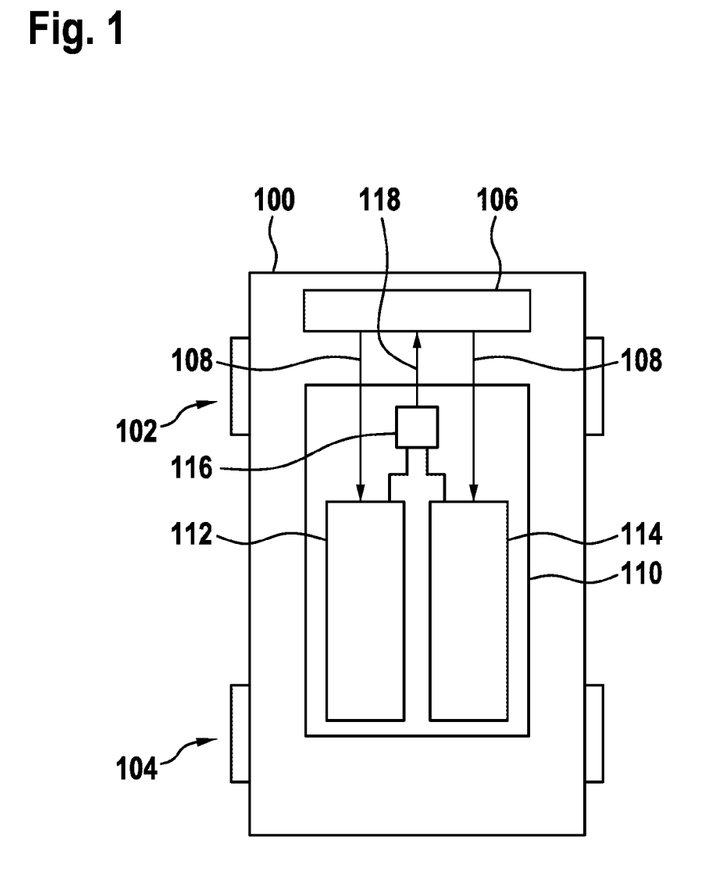
FIG. 1 shows a schematic illustration of a vehicle comprising a brake system according to an embodiment of the present invention.

FIG. 1 shows a schematic illustration of a vehicle 100 comprising a brake system 110 according to an embodiment of the present invention. The vehicle 100 is a utility vehicle or commercial vehicle, such as a truck. The vehicle 100 comprises a first axle 102 and a second axle 104, according to this embodiment. Furthermore, the vehicle 100 comprises a controller 106 and the brake system 110. The controller 106 is configured to control the brake system 110 by arrangement/structure of a command signal 108. In particular, the command signal 108 represents service brake commands for performing service brake functions of the brake system 110. Alternatively, the controller 106 also be part of the brake system 110.

The brake system 110 comprises a first service brake subsystem 112 and a second service brake subsystem 114. The first service brake subsystem 112 is configured to perform service brake functions of the brake system. The second service brake subsystem 114 is configured to perform service brake functions of the brake system 110 as a backup or to provide redundancy instead of the first service brake subsystem 112.

The brake system 110 further comprises a monitoring device 116 for monitoring a state of health of the first service brake subsystem 112 and the second service brake subsystem 114. Alternatively, the monitoring device 116 may also be part of a system other than the brake system 110. The monitoring device 116 is connected to the first service brake subsystem 112 and to the second service brake subsystem 114. The monitoring device 116 is configured to detect a potential malfunction of the first service brake subsystem 112 or of the second service brake subsystem 114. The monitoring device 116 is configured to output an error signal 118 to the controller 106. The error signal 118 represents a malfunction of the first service brake subsystem 112 or of the second service brake subsystem 114.

In response to the error signal 118, the controller 106 is configured to transmit the command signal 108 to either the first service brake subsystem 112 or the second service brake subsystem 114. More specifically, the controller 106 is configured to transmit the command signal 108 to that subsystem 112 or 114 free from malfunction, as indicated by the error signal 118.

Figure 2:
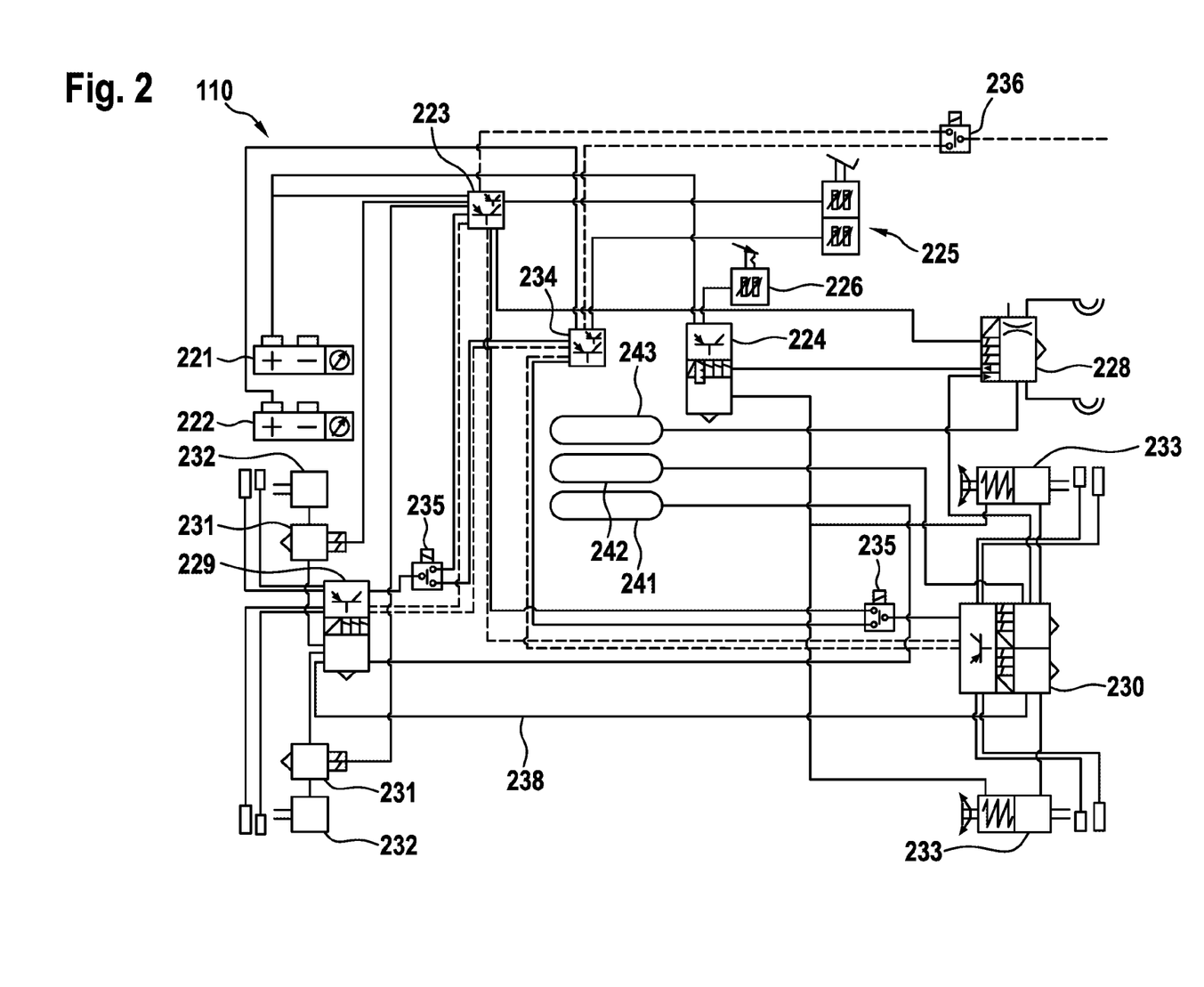
FIG. 2 shows a schematic illustration of a brake system according to an embodiment of the present invention.

FIG. 2 shows a schematic illustration of a brake system 110 according to an embodiment of the present invention. The brake system 110 is a brake system 110 for a vehicle, specifically a commercial vehicle or utility vehicle, e.g. a truck. The brake system 110 corresponds or is similar to the brake system shown in FIG. 1.

The brake system 110 comprises a first electric power supply unit 221, a second electric power supply unit 222, a first electronic brake control unit 223, a first or front axle pressure modulator 229, a second or rear axle pressure modulator 230, two service brake chambers 232, two spring brake cylinders 233, a second electronic brake control unit 234 and two power supply switches 235. According to this embodiment, the brake system 110 further comprises an electronic parking brake controller 224, a foot brake module 225, a park brake lever sensor 226, a trailer control module 228, two pressure control valves 231, a communication switch 236, a control room link 238, a first compressed air supply module 241, a second compressed air supply module 242 and a third compressed air supply module 243.

The first electric power supply unit 221 and the first electronic brake control unit 223 form part of the first service brake subsystem described with reference to FIG. 1. The second electric power supply unit 222 and the second electronic brake control unit 234 form part of the second service brake subsystem described with reference to FIG. 1. In the event of a malfunction of the first service brake subsystem, the second service brake subsystem is usable as a redundant service brake subsystem, or in other words to perform service brake functions of the brake system 110.

The first electric power supply unit 221 is electrically connected to the first electronic brake control unit 223. The first electronic brake control unit 223 is electrically connected to the first axle pressure modulator 229 via a digital electric signal line. The first electronic brake control unit 223 is electrically connected to a first one of the power supply switches 235 via an analogous electric signal and supply line. Furthermore, the first electronic brake control unit 223 is electrically connected to the second axle pressure modulator 230 via a digital electric signal line. Furthermore, the first electronic brake control unit 223 is electrically connected to a second one of the power supply switches 235 via a digital electric signal line. Also, the first electronic brake control unit 223 is electrically connected to the pressure control valves 231, to the trailer control module 228 and to the foot brake module 225 via analogous electric signal and supply lines.

The second electric power supply unit 222 is electrically connected to the second electronic brake control unit 234. The second electronic brake control unit 234 is electrically connected to the first axle pressure modulator 229 via a digital electric signal line. The second electronic brake control unit 234 is electrically connected to a second one of the power supply switches 235 via an analogous electric signal and supply line. Furthermore, the second electronic brake control unit 234 is electrically connected to the second axle pressure modulator 230 via a digital electric signal line. Furthermore, the second electronic brake control unit 234 is electrically connected to a second one of the power supply switches 235 via a digital electric signal line. Also, the second electronic brake control unit 234 is electrically connected to the foot brake module 225 via an analogous electric signal and supply line.

The communication switch 236 is connected to the first electronic brake control unit 223, the second electronic brake control unit 234 and a trailer communication interface for communication with a trailer brake system via digital electric signal lines. The communication switch 236 is configured to connect the first electronic brake control unit 223 or the second electronic brake control unit 234 to the trailer communication interface for communication with the trailer brake system.

According to the embodiment of the present invention shown in FIG. 2, the first electronic brake control unit 223 and the second electronic brake control unit 234 are identical units, or in other words configured and constructed in an identical way.

The first axle pressure modulator 229 is fluidically connected to the first compressed air supply module 241 via a pneumatic supply line. Also, the first axle pressure modulator 229 is fluidically connected to the pressure control valves 231 via pneumatic service brake control lines. Each of the pressure control valves 231 is fluidically connected to a respective one of the service brake chambers 232 via a pneumatic service brake control line. The first axle pressure modulator 229, the control valves 231 and the service brake chambers 232 are associated with a first axle of the vehicle. The first axle pressure modulator 229 is electrically connected to the first one of the power supply switches 235. Furthermore, the first axle pressure modulator 229 is electrically connected to a group of brake sensors for the first axle via analogous electric signal and supply lines.

The second axle pressure modulator 230 is fluidically connected to the second compressed air supply module 242 via a pneumatic supply line. Furthermore, the second axle pressure modulator 230 is fluidically connected to the spring brake cylinders 233 via pneumatic service brake control lines. The second axle pressure modulator 230 and the spring brake cylinders 233 are associated with a second axle of the vehicle. The second axle pressure modulator 230 is electrically connected to the second one of the power supply switches 235. Also, the second axle pressure modulator 230 is electrically connected to a group of brake sensors for the second axle via analogous electric signal and supply lines.

According to the embodiment of the present invention shown in FIG. 2, the first axle pressure modulator 229 and the second axle pressure modulator 230 are linked fluidically by the control room link 238.

The first one of the power supply switches 235, which is connected to the first electronic brake control unit 223, the second electronic brake control unit 234 and the first axle pressure modulator 229, is configured to connect the first electronic brake control unit 223 or the second electronic brake control unit 234 to the first axle pressure modulator 229. The second one of the power supply switches 235, which is connected to the first electronic brake control unit 223, the second electronic brake control unit 234 and the second axle pressure modulator 230, is configured to connect the first electronic brake control unit 223 or the second electronic brake control unit 234 to the second axle pressure modulator 230.

The trailer control module 228 is configured to control braking functions of a trailer coupled to the vehicle. The trailer control module 228 is fluidically connected to the third compressed air supply module 243 via pneumatic supply line. Also, the trailer control module 228 is fluidically connected to the second axle pressure modulator 230 via pneumatic service brake control line.

The foot brake module 225 is electrically connected to the first electronic brake control unit 223 via an analogous electric signal and supply line. Also, the foot brake module 225 is electrically connected to the second electronic brake control unit 234 via an analogous electric signal and supply line.

The electronic parking brake controller 224 is electrically connected to the first pressure electric power supply unit 221. Furthermore, the electronic parking brake controller 224 is electrically connected to the park brake lever sensor 226 via an analogous electric signal and supply line. The electronic parking brake controller 224 is fluidically connected to the spring brake cylinders 233 via pneumatic parking brake control lines. Also, the electronic parking brake controller 224 is fluidically connected to the trailer control module 228 via a pneumatic parking brake control line.

In other words, FIG. 2 shows an architecture of a brake system 110 commercial, which may also be referred to as a schematic a redundant commercial vehicle electronic or electro-pneumatic brake system 110 (EBS). The electro-pneumatic brake system 110 comprises the following main components. The brake system 110 is redundantly supplied by the electric power supply units 221 and 222, which may be batteries. The EBS electronic brake control unit 223 is supplied from the first electric power supply unit 221 or first battery 221. The electronic brake control unit 223 is configured to electronically control the front or first axle pressure modulator 229, the pressure control valves 231 on the front or first axle, the rear or second axle pressure modulator 230 and the trailer control module 228. Front or first axle wheel brakes are actuated by the service brake chambers 232. Rear or second axle wheel brakes are actuated by the spring brake cylinders 233 or spring brake combi cylinders.

The redundant pair of the brake system 110 is provided by the second electronic brake control unit 234, which is configured to actuate the front or first axle pressure modulator 229 and the rear or second axle pressure modulator 230 also via a second CAN channel (CAN=Controller Area Network) or digital electric signal line. Moreover, a pneumatic control signal is provided to the trailer control module 228. The power supply switches 235 are installed to ensure the power supply of the axle modulators or axle pressure modulators 229 and 230 from the two separate electric power supply units 221 and 222. The communication switch 236 or CAN channel selector is installed for the trailer CAN, which ensures the CAN communication between the first electronic brake control unit 223 or the second electronic brake control unit 234 and the trailer. According to an embodiment, this redundant brake architecture describes a redundant brake-by-wire system, wherein pneumatics is eliminated from a cabin of the vehicle. Control rooms of the axle pressure modulators 229 and 230 are linked pneumatically by the control room link 238, for example a pipe, which in case of any axle pressure modulator failure ensures that the given axle remains controllable by the other axle pressure modulator(s) 229 or 230.

When the brake system 110 is fully intact, the service brake is controlled by the first electronic brake control unit 223 as a master. The first electronic brake control unit 223 electronically controls the first and second axle pressure modulators 229 and 230 and the trailer control module 228. In case of any malfunction of the first electronic brake control unit 223 or the first electric power supply unit 221, brake control is taken over by the second electronic brake control unit 234, wherein the power supply switches 235 of the axle pressure modulators 229 and 230 are switched to the second electric power supply unit 222 if required, and the axle pressure modulators 229 and 230 are controlled electronically by the second electronic brake control unit 234 via second CAN channels of the axle pressure modulators 229 and 230.

Figure 3:
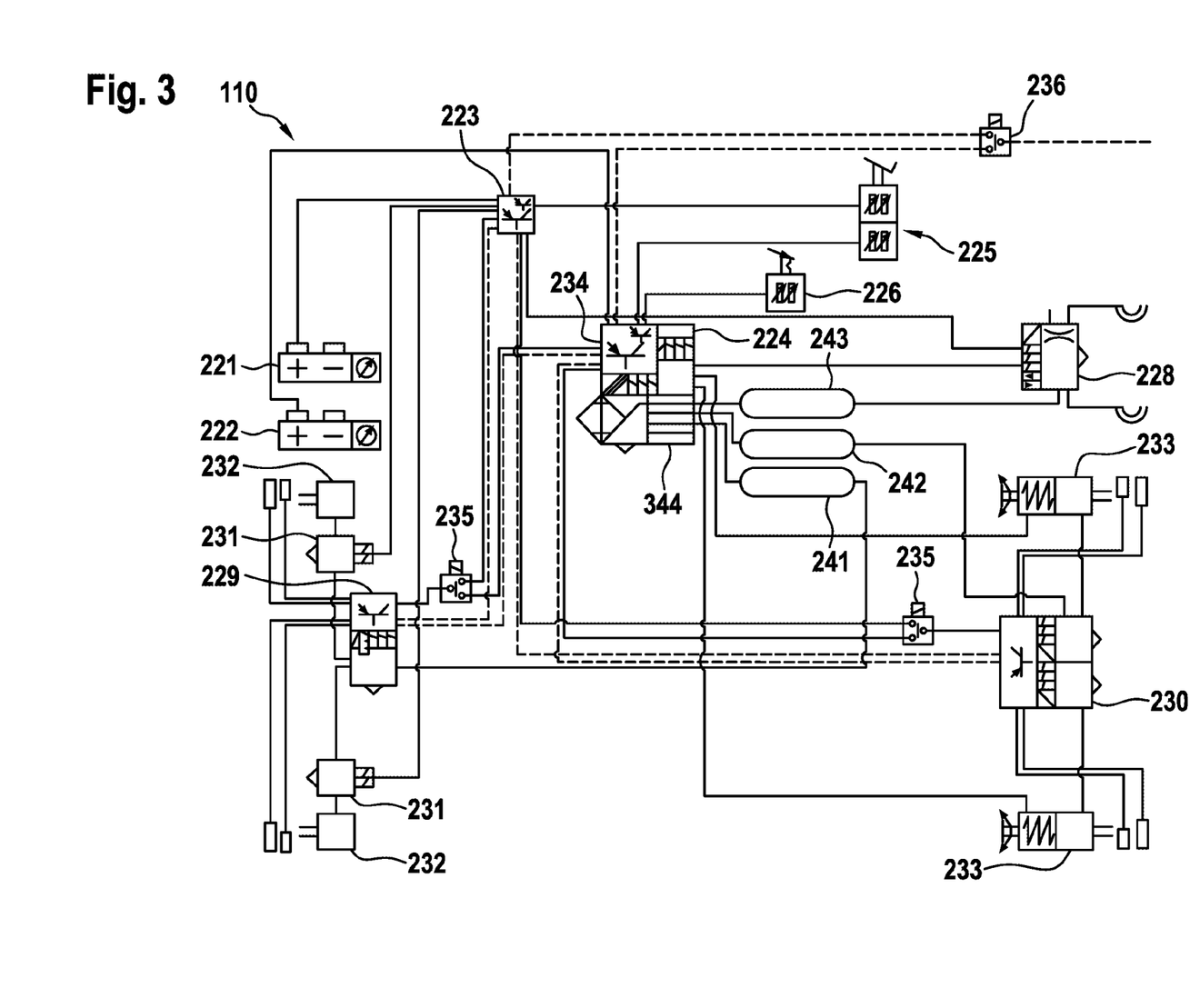
FIG. 3 shows a schematic illustration of a brake system according to an embodiment of the present invention.

FIG. 3 shows a schematic illustration of a brake system 110 according to an embodiment of the present invention. The brake system 110 shown in FIG. 3 corresponds to the brake system shown in FIG. 2 with the exception of the control room link being omitted, the pneumatic service brake control line between the second axle pressure modulator 230 and the trailer control module 228 being omitted, and the second electronic brake control unit 234 being integrated with the electronic parking brake controller 224 and an electronic air supply control unit 344. Thus, the second electronic brake control unit 234, the electronic parking brake controller 224 and the electronic air supply control unit 344 form or are part of a single physical unit. The electronic air supply control unit 344 is connected to the compressed air supply modules 241, 242 and 243 via pneumatic supply lines.

Figure 4:
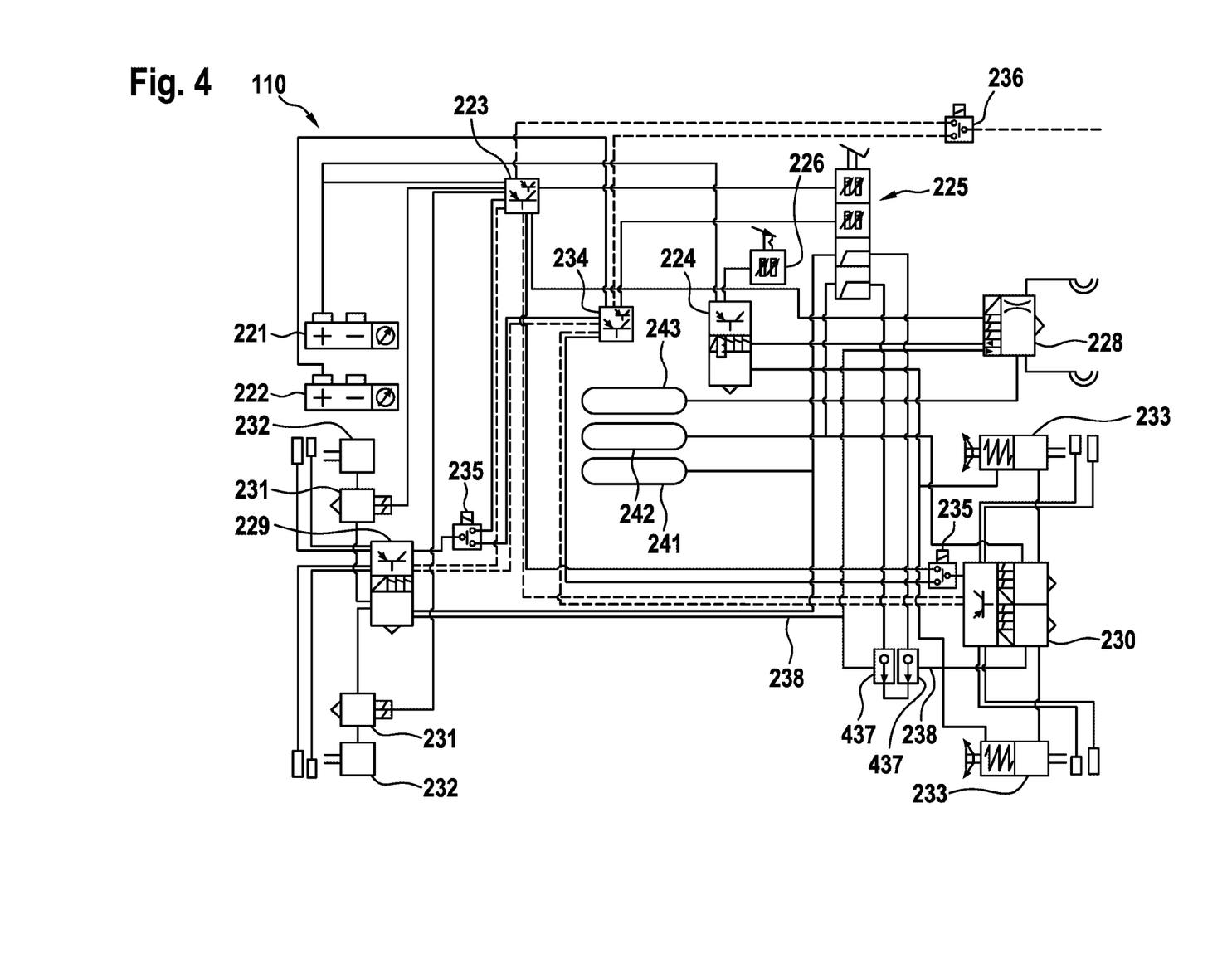
FIG. 4 shows a schematic illustration of a brake system according to an embodiment of the present invention.

FIG. 4 shows a schematic illustration of a brake system 110 according to an embodiment of the present invention. The brake system 110 shown in FIG. 4 corresponds to the brake system shown in FIG. 2 with the exception of the pneumatic service brake control line between the second axle pressure modulator 230 and the trailer control module 228 being omitted, the foot brake module 225 being fluidically connected to the first compressed air supply module 241 and to the second compressed air supply module 242, and two interrupt valves 437 being connected into the control room link 238.

As already mentioned with reference to FIG. 2, the foot brake module 225 is connected to the first electronic brake control unit 223 and to the second electronic brake control unit 234. Furthermore, the foot brake module 225 is fluidically connected to the first compressed air supply module 241 for the first axle pressure modulator 229 and to the second compressed air supply module 242 for the second axle pressure modulator 230. Thus, the foot brake module 225 also is fluidically connected to the first axle pressure modulator 229 and to the second axle pressure modulator 230. The interrupt valves 437 are fluidically connected to the foot brake module 225. The interrupt valves 437 are configured to fluidically connect the first axle pressure modulator 229 and the second axle pressure modulator 230 to each other or to the foot brake module 225.

In other words, according to this embodiment, in order to provide pneumatic backup, backup ports of the axle pressure modulators 229 and 230 are also linked pneumatically via the control room link 238, but also can be driven pneumatically by the foot brake module 225. It is possible to set up a redundancy order as follows: In case of an intact brake system 110, the first electronic brake control unit 223 controls service brake functions of the brake system 110. In case of malfunction of the first brake circuit or first service brake subsystem, the second electronic brake control unit 234 takes over control. If both brake circuits get suffer malfunctions, the pneumatic backup will be put in charge, and the pneumatic connection between the backup ports of the axle pressure modulators 229 and 230 is interrupted by the interrupt valves 437, in order to be able to control them independently by the foot brake module 225. By default, the backup ports are linked together, ensured by two monostable select high valves as interrupt valves 437.

Figure 5:
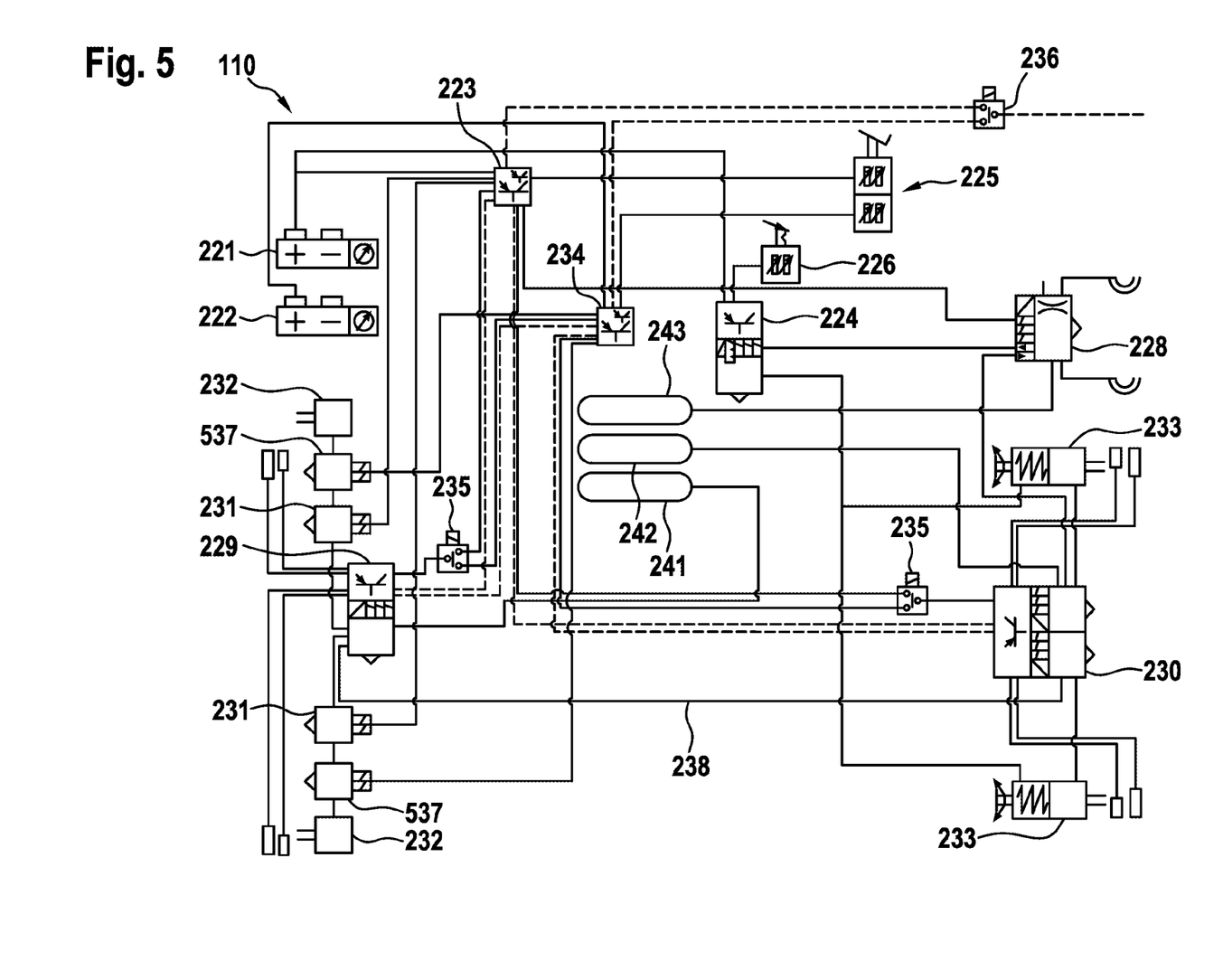
FIG. 5 shows a schematic illustration of a brake system according to an embodiment of the present invention.

FIG. 5 shows a schematic illustration of a brake system 110 according to an embodiment of the present invention. The brake system 110 shown in FIG. 5 corresponds to the brake system shown in FIG. 2 with the exception of two additional pressure control valves 537. Each of the additional pressure control valves 537 is fluidically connected between respective ones of the pressure control valves 231 and of the service brake chambers 232. Furthermore, the additional pressure control valves 537 are electrically connected to the second electronic brake control unit 234 via analogous electric signal and supply lines.

In other words, in this redundant layout of the brake system 110, the additional pressure control valves 537 are installed on the front axle so that the redundant brake system 110 is functionally identical or comparable with an intact brake system. In this case, front axle pressure can be independently modulated sidewise, which means that the front axle comprises two-channel configuration.

Figure 6:
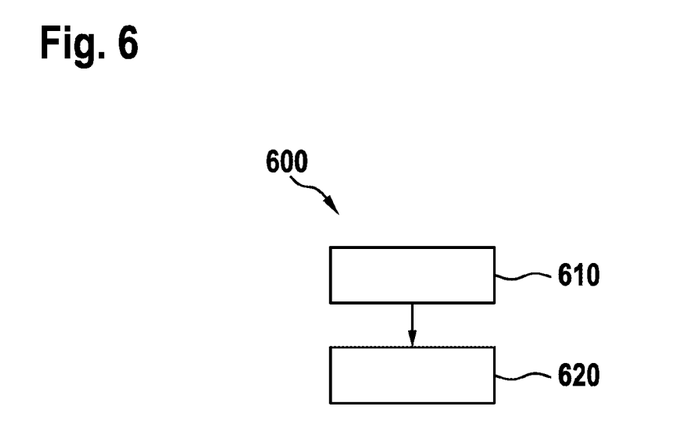
FIG. 6 shows a flowchart of a method of controlling a brake system according to an embodiment of the present invention.

FIG. 6 shows a flowchart of a method 600 of controlling a brake system according to an embodiment of the present invention. The method 600 is executable in connection with the brake system as described with reference to one of the preceding figures or a similar brake system.

In general, the method 600 can be executed in connection with a brake system for a vehicle. Such a brake system comprises a first electric power supply unit, a first electronic brake control unit, wherein the first electronic brake control unit is connected to the first electric power supply unit, a second electric power supply unit, a second electronic brake control unit, wherein the second electronic brake control unit is connected to the second electric power supply unit, a first axle pressure modulator for service brake chambers associated with a first axle of the vehicle, a second axle pressure modulator for spring brake cylinders associated with a second axle of the vehicle, and two power supply switches, wherein a first one of the power supply switches is connected to the first electronic brake control unit, the second electronic brake control unit and the first axle pressure modulator and configured to connect the first electronic brake control unit or the second electronic brake control unit to the first axle pressure modulator, wherein a second one of the power supply switches is connected to the first electronic brake control unit, the second electronic brake control unit and the second axle pressure modulator and configured to connect the first electronic brake control unit or the second electronic brake control unit to the second axle pressure modulator.

The method 600 of controlling comprises a step 610 of receiving an error signal representing a malfunction of the first electric power supply unit or the first electronic brake control unit or a malfunction of the second electric power supply unit or the second electronic brake control unit. Furthermore, the method 600 of controlling comprises a step 620 of transmitting service brake commands of the vehicle to the second electronic brake control unit in the event of a malfunction of the first electric power supply unit or the first electronic brake control unit or to the first electronic brake control unit in the event of a malfunction of the second electric power supply unit or the second electronic brake control unit.

With reference to the aforementioned figures, according to an embodiment, what is provided is a system of a commercial vehicle 100 with a brake system 110 comprising an electro-pneumatic service brake subsystem and an electro-pneumatic parking brake subsystem. Redundant brake circuits in form of the first and second service brake subsystems 112 and 114 are equipped with electro-pneumatic axle/wheel modules (EPMs) in such a way that the axle pressure modules 229 and 230 have dual CAN communication interfaces and redundant power supply through the power supply switches 335, in order to ensure communication with any of the first and second electronic brake control units 223 and 234 and to be able to be driven by any of the first and second electrical power supply units 221 and 222.

THE REFERENCE NUMERAL LIST IS AS FOLLOWS 100 vehicle
102 first axle
104 second axle
106 controller
108 command signal
110 brake system
112 first service brake subsystem 114 second service brake subsystem
116 monitoring device
118 error signal
221 first electric power supply unit
222 second electric power supply unit
223 first electronic brake control unit
224 electronic parking brake controller
225 foot brake module
226 park brake lever sensor
228 trailer control module
229 first axle pressure modulator
230 second axle pressure modulator
231 pressure control valve
232 service brake chamber
233 spring brake cylinder
234 second electronic brake control unit
235 power supply switch
236 communication switch
238 control room link
241 first compressed air supply module
242 second compressed air supply module
243 third compressed air supply module
344 electronic air supply control unit
437 interrupt valve
537 additional pressure control valve
600 method of controlling
610 step of receiving
620 step of transmitting

The invention claimed is:

1. A brake system for a vehicle, the vehicle having a controller, the brake system comprising:
a first electric power supply unit;
a first electronic brake control unit connected to the first electric power supply unit;
a second electric power supply unit;
a second electronic brake control unit connected to the second electric power supply unit;
a first axle pressure modulator for service brake chambers associated with a first axle of the vehicle;
a second axle pressure modulator for spring brake cylinders associated with a second axle of the vehicle;
two power supply switches, wherein a first one of the power supply switches is connected to the first electronic brake control unit, wherein a second one of the two power supply switches is connected to the second electronic brake control unit; and
a monitoring device connected to a first service brake subsystem and a second service brake subsystem for monitoring and detecting a malfunction of the first service brake subsystem and/or the second service brake subsystem, wherein the monitoring device outputs an error signal to the controller when the malfunction is detected;
wherein the first electronic brake control unit is electrically connected to the first axle pressure modulator via a first digital electric signal line, wherein the first electronic brake control unit is electrically connected to the second axle pressure modulator via a second digital electric signal line, and
the second electronic brake control unit is electrically connected to the first axle pressure modulator via a third digital electric signal line, wherein the second electronic brake control unit is electrically connected to the second axle pressure modulator via a fourth digital electric signal line, and
wherein each of the power supply switches is configured for selecting one of the electric power supply units for one of the axle pressure modulators.

2. The brake system of claim 1, wherein the first electric power supply unit and the first electronic brake control unit form part of the first service brake subsystem, wherein the second electric power supply unit and the second electronic brake control unit form part of the second service brake subsystem, and wherein in the event of a malfunction of the first service brake subsystem the second service brake subsystem is usable as a redundant service brake subsystem.

3. The brake system of claim 1, further comprising:
a communication switch connected to the first electronic brake control unit, the second electronic brake control unit and a trailer communication interface for communication with a trailer brake system, wherein the communication switch is configured to connect the first electronic brake control unit or the second electronic brake control unit to the trailer communication interface.

4. The brake system of claim 1, wherein the first electronic brake control unit and the second electronic brake control unit are identical units.

5. The brake system of claim 1, further comprising:
a control room link for fluidically linking the first axle pressure modulator and the second axle pressure modulator.

6. The brake system of claim 1, further comprising:
a trailer control module, for controlling braking functions of a trailer of the vehicle, connected to the first electronic brake control unit, wherein the trailer control module is fluidically connected to the second axle pressure modulator.

7. A vehicle having a controller, the vehicle comprising:
a brake system, including:
a first electric power supply unit;
a first electronic brake control unit connected to the first electric power supply unit;
a second electric power supply unit;
a second electronic brake control unit connected to the second electric power supply unit;
a first axle pressure modulator for service brake chambers associated with a first axle of the vehicle;
a second axle pressure modulator for spring brake cylinders associated with a second axle of the vehicle;
two power supply switches, wherein a first one of the power supply switches is connected to the first electronic brake control unit, wherein a second one of the two power supply switches is connected to the second electronic brake control unit; and
a monitoring device connected to a first service brake subsystem and a second service brake subsystem for monitoring and detecting a malfunction of the first service brake subsystem and/or the second service brake subsystem, wherein the monitoring device outputs an error signal to the controller when the malfunction is detected;
the first axle; and
the second axle;
wherein the first electronic brake control unit is electrically connected to the first axle pressure modulator via a first digital electric signal line, wherein the first electronic brake control unit is electrically connected to the second axle pressure modulator via a second digital electric signal line, and the second electronic brake control unit is electrically connected to the first axle pressure modulator via a third digital electric signal line, wherein the second electronic brake control unit is electrically connected to the second axle pressure modulator via a fourth digital electric signal line, and wherein each of the power supply switches is configured for selecting one of the electric power supply units for one of the axle pressure modulators.

8. A method of controlling a brake system for a vehicle having a controller, the method comprising:

receiving an error signal representing a malfunction of a first electric power supply unit or a first electronic brake control unit or a malfunction of a second electric power supply unit or a second electronic brake control unit; and transmitting service brake commands of the vehicle to the second electronic brake control unit in the event of a malfunction of the first electric power supply unit or the first electronic brake control unit or to the first electronic brake control unit in the event of a malfunction of the second electric power supply unit or the second electronic brake control unit;

wherein the brake system includes:
the first electric power supply unit;
the first electronic brake control unit connected to the first electric power supply unit;
the second electric power supply unit;
the second electronic brake control unit connected to the second electric power supply unit;
a first axle pressure modulator for service brake chambers associated with a first axle of the vehicle;
a second axle pressure modulator for spring brake cylinders associated with a second axle of the vehicle; and
two power supply switches, wherein a first one of the power supply switches is connected to the first electronic brake control unit, wherein a second one of the two power supply switches is connected to the second electronic brake control unit; and
a monitoring device connected to a first service brake subsystem and a second service brake subsystem for monitoring and detecting a malfunction of the first service brake subsystem and/or the second service brake subsystem, wherein the monitoring device outputs an error signal to the controller when the malfunction is detected;

wherein the first electronic brake control unit is electrically connected to the first axle pressure modulator via a first digital electric signal line, wherein the first electronic brake control unit is electrically connected to the second axle pressure modulator via a second digital electric signal line, and the second electronic brake control unit is electrically connected to the first axle pressure modulator via a third digital electric signal line, wherein the second electronic brake control unit is electrically connected to the second axle pressure modulator via a fourth digital electric signal line, and wherein each of the power supply switches is configured for selecting one of the electric power supply units for one of the axle pressure modulators.

\* \* \* \* \*